United States Patent
Chen et al.

(10) Patent No.: US 8,588,287 B2
(45) Date of Patent: Nov. 19, 2013

(54) METHOD, DEVICE AND SYSTEM FOR DETECTING CHANNEL QUALITY

(75) Inventors: Zhiqun Chen, Shanghai (CN); Feng Li, Shanghai (CN); Gengshi Wu, Shanghai (CN); Haitao Zhang, Shanghai (CN); Jing Yang, Shanghai (CN); Xiuqin Peng, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/446,554

(22) Filed: Apr. 13, 2012

(65) Prior Publication Data

US 2012/0195357 A1 Aug. 2, 2012

Related U.S. Application Data

(63) Continuation of application No. PCT/CN2010/076098, filed on Aug. 18, 2010.

(30) Foreign Application Priority Data

Oct. 14, 2009 (CN) .......................... 2009 1 0093618

(51) Int. Cl.
 *H04B 3/46* (2006.01)
(52) U.S. Cl.
 USPC .......................... 375/224; 375/295; 455/522
(58) Field of Classification Search
 None
 See application file for complete search history.

(56) References Cited

U.S. PATENT DOCUMENTS

| 6,459,884 B1 * | 10/2002 | Amezawa .................. 455/67.16 |
| 6,792,053 B1 | 9/2004 | Vainio et al. |
| 2003/0103577 A1 * | 6/2003 | Harada et al. ................. 375/295 |
| 2006/0217096 A1 | 9/2006 | Le Goff |
| 2006/0262754 A1 | 11/2006 | Andersson et al. |
| 2007/0191047 A1 | 8/2007 | Catreux-Erceg et al. |
| 2007/0287382 A1 | 12/2007 | Catreux-Erceg et al. |
| 2008/0137633 A1 | 6/2008 | Okamoto et al. |
| 2009/0137264 A1 * | 5/2009 | Matsumoto ................... 455/522 |
| 2010/0202399 A1 * | 8/2010 | Catreux-Erceg et al. ..... 370/329 |

FOREIGN PATENT DOCUMENTS

| CN | 1258402 | 6/2000 |
| CN | 1762121 | 4/2006 |
| CN | 101442361 | 5/2009 |
| CN | 101674639 | 3/2010 |

OTHER PUBLICATIONS

European Search Report issued on Oct. 24, 2012 in corresponding European Patent Application No. 10823025.1.
International Search Report for PCT/CN2010/076098 mailed Dec. 2, 2010.
Written Opinion of the International Searching Authority mailed Dec. 2, 2010 issued in corresponding International Patent Application No. PCT/CN2010/076098.

* cited by examiner

*Primary Examiner* — Leon-Viet Nguyen
(74) *Attorney, Agent, or Firm* — Staas & Halsey LLP

(57) ABSTRACT

A method, a device and a system for detecting channel quality are provided. The method includes: judging whether a Transmit Power Control (TPC) symbol output by a receiver is an invalid symbol; when the TPC symbol is a valid symbol, judging whether polarities of in-phase/quadrature (I/Q) components of the valid symbol are opposite to each other; counting the number of invalid symbols, the number of valid symbols, and the number of valid symbols with opposite polarities; and estimating a Bit Error Rate (BER) according to the number of the invalid symbols, the number of the valid symbols, and the number of the valid symbols with the opposite polarities, and detecting the channel quality through the BER.

8 Claims, 6 Drawing Sheets

METHOD, DEVICE AND SYSTEM FOR DETECTING CHANNEL QUALITY

CROSS-REFERENCE TO RELATED APPLICATIONS

This application is a continuation of International Application No. PCT/CN2010/076098, filed on Aug. 18, 2010, which claims priority to Chinese Patent Application No. 200910093618.6, filed on Oct. 14, 2009, both of which are hereby incorporated by reference in their entireties.

FIELD OF THE INVENTION

The present invention relates to the field of communications technologies, and in particular, to a method, a device and a system for detecting channel quality.

BACKGROUND OF THE INVENTION

In a Wideband Code Division Multiple Access (WCDMA) system, a Fractional Dedicated Physical Channel (F-DPCH) is used as one of downlink Dedicated Physical Control Channels (DPCCHs), and is configured to bear a Transmit Power Control (TPC) command generated in a physical layer. In a downlink, a configured TPC domain of the F-DPCH is used to estimate signal quality, that is, count a Bit Error Rate (BER) based on TPC symbols, for in-sync/out-of-sync decision and outer-loop power control, and channel quality detection.

In the prior art, the probability of occurrence of an event "polarities of in-phase/quadrature (I/Q) components of the TPC symbol are opposite to each other" in a counting period is $p_1$, which is obtained through statistics, and the probability of occurrence of an event "a wrong decision is made on the TPC symbol and the polarities of the I/Q components of the TPC symbol are the same" is $p_2$, which is obtained through statistics. The BER of the TPC symbol may be estimated according to the probabilities $p_1$ and $p_2$ obtained through statistics and the following formula (1):

$$BER = \frac{1}{2}p_1 + \frac{1}{4}\left(\frac{p_1^2}{1-p_1}\right) \quad (1)$$

During the implementation of the present invention, the inventors find that the prior art at least has the following defects. In the case that a channel condition is poor, that is, the TPC symbol has no path, the TPC symbols output by a RAKE receiver are all 0, $p_1$ is 0 in this case, and then the BER obtained through the foregoing formula (1) is also 0, and such an estimation result is apparently inconsistent with an actual condition. It can be seen that, the solution in the prior art is not applicable to the case of an invalid TPC symbol, particularly, to the case where the TPC symbol has no path. At this time, the BER cannot be correctly estimated, thereby affecting the in-sync/out-of-sync decision and the outer-loop power control performance, and failing to correctly detect the channel quality.

SUMMARY OF THE INVENTION

Embodiments of the present invention provide a method, a device and a system for detecting channel quality, which overcome the defect that the BER cannot be correctly estimated in the case of an invalid TPC symbol in the prior art, and more correctly estimate the BER, so as to correctly perform in-sync decision and outer-loop power control.

In order to achieve the foregoing objectives, an embodiment of the present invention provides a method for detecting channel quality, which includes:

judging whether a TPC symbol output by a receiver is an invalid symbol; when the TPC symbol is a valid symbol, judging whether polarities of I/Q components of the valid symbol are opposite to each other;

counting the number of invalid symbols, the number of valid symbols, and the number of valid symbols with opposite polarities; and estimating a BER according to the number of the invalid symbols, the number of the valid symbols, and the number of the valid symbols with the opposite polarities, and detecting the channel quality through the BER.

An embodiment of the present invention further provides a device for detecting channel quality, which includes:

a first judging module, configured to judge whether a TPC symbol output by a receiver is an invalid symbol;

a second judging module, configured to judge whether polarities of I/Q components of a valid symbol are opposite to each other when the TPC symbol is a valid symbol;

a counting module, configured to count the number of invalid symbols, the number of valid symbols, and the number of valid symbols with opposite polarities according to judgment results of the first judging module and the second judging module; and an estimation module, configured to estimate a BER according to the number of the invalid symbols, the number of the valid symbols, and the number of the valid symbols with the opposite polarities, and detect the channel quality through the BER.

An embodiment of the present invention further provides a system for detecting channel quality, which includes the device for detecting the channel quality.

Through the method, the device and the system for detecting the channel quality according to the embodiments of the present invention, it is judged whether the TPC symbol is an invalid symbol, it is further judged whether the polarities of I/Q components of the valid symbol are opposite to each other, the number of the invalid symbols, the number of the valid symbols, and the number of the valid symbols with the opposite polarities are counted according to the judgment results, and the BER is estimated according to the counted numbers, so as to detect the channel quality through the BER, thereby overcoming the defect that the BER cannot be correctly estimated in the case of an invalid TPC symbol in the prior art, and more correctly estimating the BER, so as to correctly perform the in-sync decision and the outer-loop power control.

DETAILED DESCRIPTION OF THE EMBODIMENTS

The technical solution of the present invention is further described in detail in the following with reference to the accompanying drawings and the embodiments.

Figure 1:
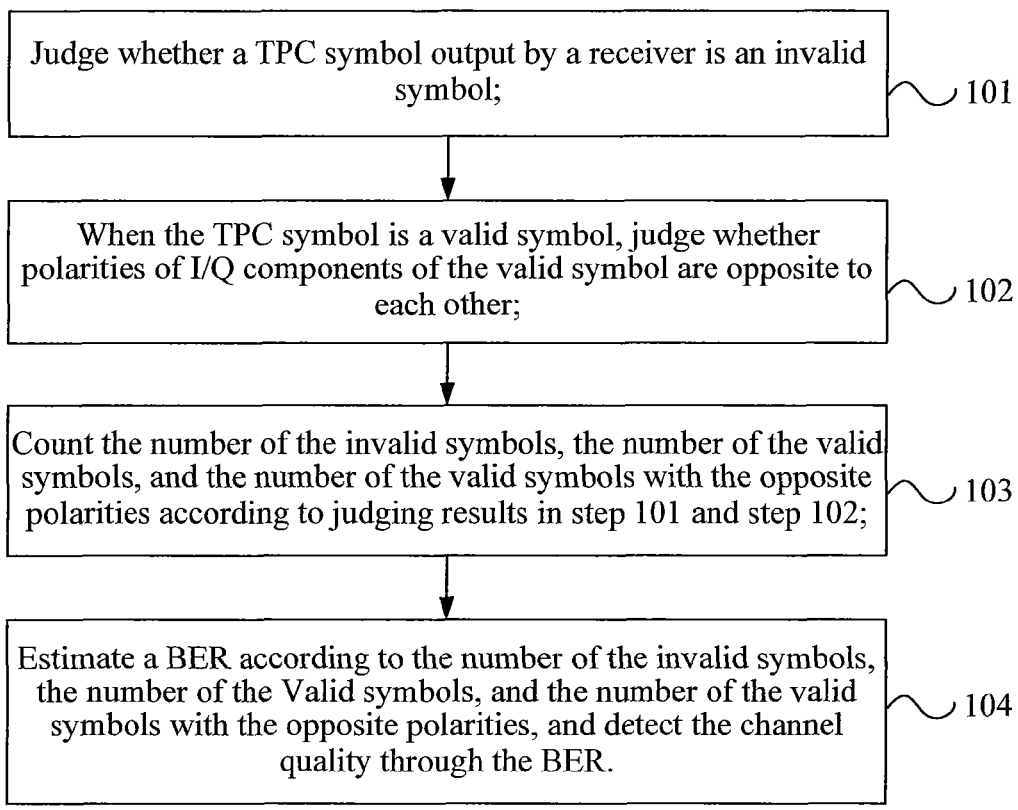
FIG. 1 is a flow chart of Embodiment 1 of a method for detecting channel quality according to the present invention.

FIG. 1 is a flow chart of Embodiment 1 of a method for detecting channel quality according to the present invention. As shown in FIG. 1, this embodiment provides a method for detecting the channel quality, which may include the following steps.

Step 101: Judge whether a TPC symbol output by a receiver is an invalid symbol.

Step 102: When the TPC symbol is a valid symbol, judge whether polarities of I/Q components of the valid symbol are opposite to each other.

Step 103: Count the number of invalid symbols, the number of valid symbols and the number of valid symbols with opposite polarities according to judgment results in step 101 and step 102.

Step 104: Estimate a BER according to the number of the invalid symbols, the number of the valid symbols, and the number of the valid symbols with the opposite polarities, and detect the channel quality through the BER.

Through the method for detecting the channel quality provided by this embodiment, it is judged whether the TPC symbol is the invalid symbol, the polarities of the I/Q components of the valid symbol are further judged, the number of the invalid symbols, the number of the valid symbols, and the number of the valid symbols with the opposite polarities are counted according to the judgment results, and the BER is estimated according to the counted numbers, so as to detect the channel quality through the BER, thereby overcoming the defect that the BER cannot be correctly estimated in the case of an invalid TPC symbol in the prior art, and more correctly estimating the BER, so as to correctly perform in-sync decision and outer-loop power control.

Figure 2:
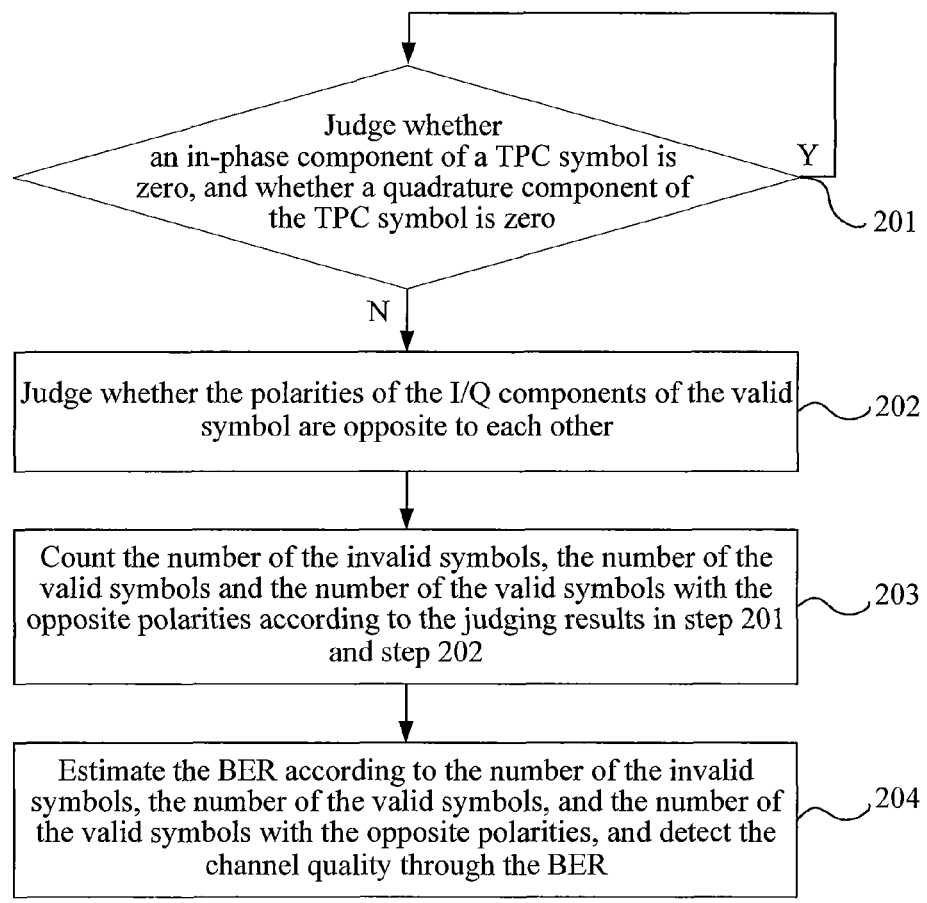
FIG. 2 is a flow chart of Embodiment 2 of a method for detecting channel quality according to the present invention.

FIG. 2 is a flow chart of Embodiment 2 of a method for detecting channel quality according to the present invention. As shown in FIG. 2, this embodiment provides a method for detecting the channel quality, which may include the following steps.

Step 201: Judge whether an in-phase component of a TPC symbol output by a receiver is zero, and whether a quadrature component of the TPC symbol is zero, and if the in-phase component of the TPC symbol is zero, and the quadrature component of the TPC symbol is also zero, continue to judge the next TPC symbol, repeat step 201; if the in-phase component of the TPC symbol is not zero, or the quadrature component of the TPC symbol is not zero, perform step 202.

In this embodiment, the channel quality is detected by estimating the BER of the channel, and during the estimation of the BER, it is required to count a plurality of TPC symbols output by a RAKE receiver in a certain BER counting period T for estimation. Therefore, in this step, validity of the plurality of TPC symbols in the BER counting period T is sequentially judged. In this step, when the validity of the TPC symbol output by the RAKE receiver is judged, specifically, it is judged whether soft values of the in-phase component (I component) and the quadrature component (Q component) of the TPC symbol are zero, in which the in-phase component of the TPC symbol may be a real part of the soft value of the TPC symbol, and the quadrature component of the TPC symbol may be an imaginary part of the soft value of the TPC symbol. If the soft value of the in-phase component of the TPC symbol output by the RAKE receiver is zero, and the soft value of the quadrature component of the TPC symbol output by the RAKE receiver is also zero, it indicates that the TPC symbol output by the RAKE receiver is an invalid symbol. If the soft value of the in-phase component or the quadrature component of the TPC symbol output by the RAKE receiver is not zero, it indicates that the TPC symbol output by the RAKE receiver is a valid symbol. If the TPC symbol is the valid symbol, the number of the valid symbols is increased, and the subsequent step 202 is further performed; and if the TPC symbol is the invalid symbol, the number of the invalid symbols is increased, and the validity of the next TPC symbol output by the RAKE receiver is further judged, that is, step 201 is repeated till the judgment of all the TPC symbols output by the RAKE receiver in the BER counting period T is completed.

Step 202: Judge whether the polarities of the I/Q components of the valid symbol are opposite to each other.

Since the polarities of the I/Q components of the transmitted TPC symbol are the same, the polarities of the I/Q components of the TPC symbol output by the RAKE receiver should be the same, and if the polarities are different, it indicates that a transmission error occurs and the channel quality is poor. Therefore, in this embodiment, when the BER of the channel is estimated, the invalid symbol is used as a factor of the bit error. Besides, an event "the TPC symbol is a valid symbol, but the polarities of the I/Q components of the valid symbol are opposite to each other" is further considered, and such a factor is also one manifestation of the bit error. When the judgment result in step 201 is that the TPC symbol is a valid symbol, it is further judged whether the polarities of the I/Q components of the valid symbol are opposite to each other. If the polarities of the I/Q components of the valid symbol are opposite to each other, the number of the valid symbols with the opposite polarities is increased, and the validity of the next TPC symbol output by the RAKE receiver is judged, that is, step 201 is repeated till the judgment of all the TPC symbols output by the RAKE receiver in the BER counting period T is completed. If the polarities of the I/Q components of the valid symbol are the same, the number of the valid symbols is increased, and the validity of a next TPC symbol output by the RAKE receiver is judged, that is, step 201 is repeated till the judgment of all the TPC symbols output by the RAKE receiver in the BER counting period T is completed.

Step 203: Count the number of the invalid symbols, the number of the valid symbols and the number of the valid symbols with the opposite polarities according to the judgment results in step 201 and step 202.

In this embodiment, $N_v$ represents the number of the valid symbols, $N_u$ represents the number of the invalid symbols, and $N_e$ represents the number of the valid symbols with the opposite polarities. After performing the judgment in step 201 and step 202, the number of the invalid symbols and the number of the valid symbols are counted according to the judgment result of step 201, that is, after step 201 is performed each time, when the TPC symbol is the valid symbol, the number $N_v$ of the valid symbols is updated, so that 1 is added to the number $N_v$ of the valid symbols, that is, $N_v+1$, and the number $N_u$ of the invalid symbols is not changed. When the TPC symbol is the invalid symbol, the number $N_u$ of the invalid symbols is updated, so that 1 is added to the number $N_u$ of the invalid symbols, that is, $N_u+1$, and the number $N_v$ of the valid symbols is not changed. The number of the valid symbols with the opposite polarities is counted according to the judgment result of step 202, that is, after performing step 202 each time, when the polarities of the I/Q components of the valid symbol are opposite to each other, the number of the valid symbols with the opposite polarities is updated, so that 1 is added to the number $N_e$ of the valid symbols with the opposite polarities, that is, $N_e+1$, and the number of the valid symbols and the number $N_u$ of the invalid symbols are not changed. After the judgment of all the TPC symbols output by the RAKE receiver in the BER counting period T is completed, the final counting total values of the number $N_v$ of the valid symbols, the number $N_u$ of the invalid symbols and the number $N_e$ of the valid symbols with the opposite polarities are obtained.

Step 204: Estimate the BER according to the number of the invalid symbols, the number of the valid symbols, and the number of the valid symbols with the opposite polarities, and detect the channel quality through the BER.

After the number $N_v$ of the valid symbols, the number $N_u$ of the invalid symbols and the number $N_e$ of the valid symbols with the opposite polarities are obtained through counting, in this step, it is further judged whether the number $N_v$ of the valid symbols is not zero, and if $N_v$ is not zero, $$P = \frac{N_e}{N_v}$$

is enabled; and if $N_v=0$, $P=0$ is enabled. Specifically, the BER is estimated according to the number $N_v$ of the valid symbols, the number $N_u$ of the invalid symbols and the number $N_e$ of the valid symbols with the opposite polarities, and the estimation of the BER may be obtained through the following formula (2):

$$\frac{\left(0.5P + 0.25\frac{P^2}{1-P}\right)N_v + 0.5N_u}{N_v + N_u}, \quad (2)$$

in which, $$P = \frac{N_e}{N_v},$$

$N_v$ is the number of the valid symbols, $N_u$ is the number of the invalid symbols, and $N_e$ is the number of the valid symbols with the opposite polarities. It should be noted that, when $N=0$, $P=0$ and then BER=0.5. The channel quality may be detected according to the estimated BER. The larger value of the BER indicates poorer quality of the current channel, and the smaller value of the BER indicates better quality of the current channel.

Figure 3:
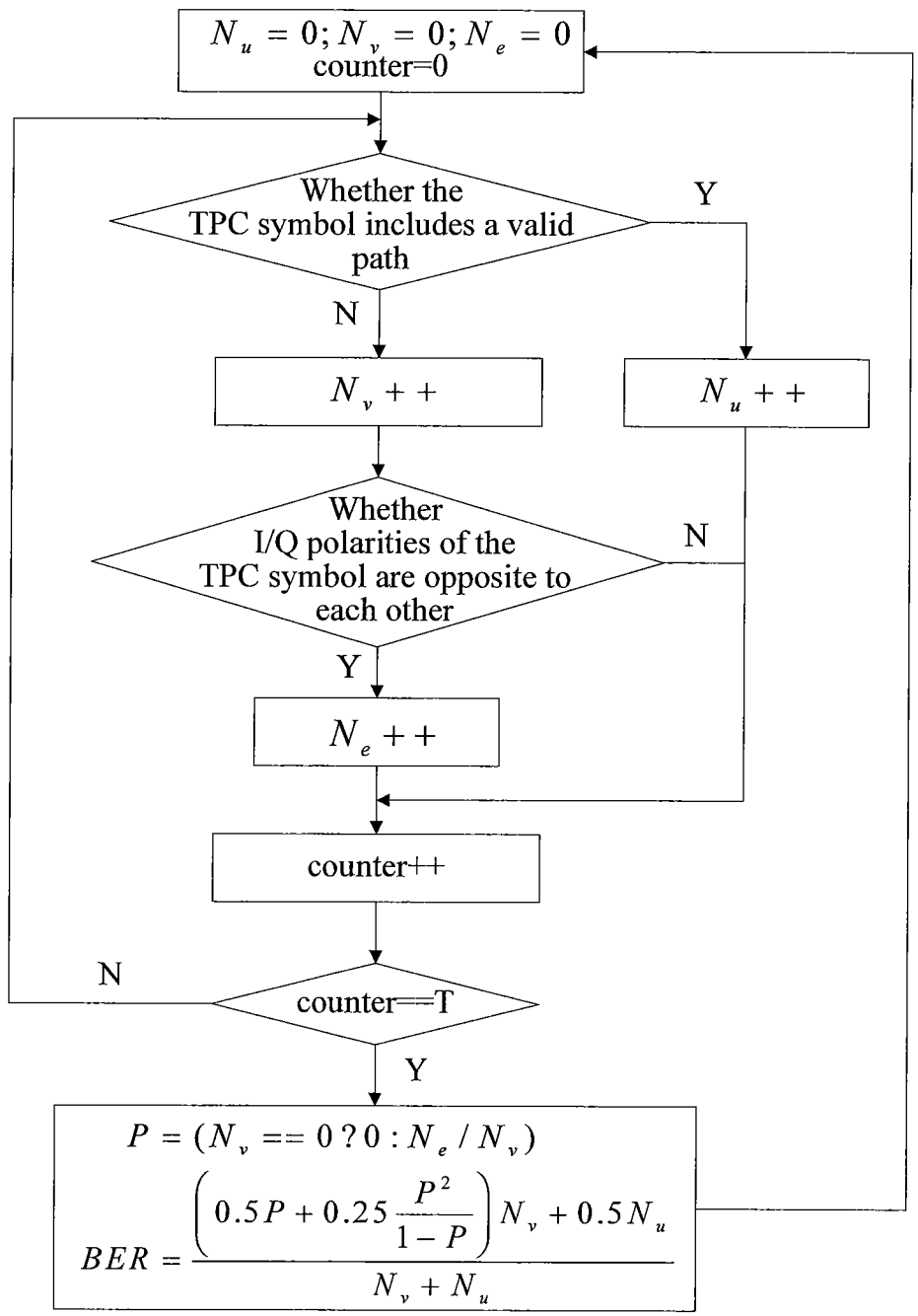
FIG. 3 is a specific flow chart of software implementation in Embodiment 2 of the method for detecting channel quality according to the present invention.

Specifically, FIG. 3 is a specific flow chart of software implementation in Embodiment 2 of the method for detecting the channel quality. As shown in FIG. 3, it is supposed that the BER counting period is T, a variable "counter" is a counting time variable, and before the counting and estimation, initial values of $N_u$, $N_v$, $N_e$ and counter are all zero. In FIG. 3, "Re(fdpch)" represents a real part of the TPC symbol output by the RAKE receiver, "Im(fdpch)" represents an imaginary part of the TPC symbol output by the RAKE receiver, "counter=T" represents that it is judged whether the variable "counter" is equal to T, "P=($N_v$==0?0:$N_e/N_v$)" represents that P=0 when $N_v$ is equal to zero, and P=$N_e/N_v$ when $N_v$ is not equal to zero, and "$N_u$++" represents $N_u+1$. Other symbols are similar thereto, which are not described in detail herein again. It can be seen from FIG. 3 that, when it is judged that Re(fdpch) is equal to 0 and Im(fdpch) is also equal to 0, the command "$N_u$++" is executed, that is, the number of the invalid symbols is updated; if Re(fdpch) is not equal to 0, or Im(fdpch) is not equal to 0, the command "$N_v$++" is executed, that is, the number of the valid symbols is updated. After the command "$N_v$++" is executed, it is further judged whether the polarities of the I/Q components of the valid symbol are opposite to each other, that is, whether the I/Q polarities of the valid symbol are opposite to each other, and if the polarities are opposite to each other, the command "$N_v$++" is executed, that is, the number of the valid symbols with the opposite polarities is updated, and the command "counter++" is further executed. After the command "counter++" is executed, it is judged whether the current variable "counter" is equal to the BER counting period T, and if counter=T, it indicates that the BER counting period is over. The estimation of the BER begins, the command "P=($N_v$==0?0: $N_e/N_v$" is executed, the BER is estimated through the foregoing formula (2) according to the currently counted $N_u$, $N_v$ and $N_e$, the estimation of the BER in the current BER counting period is completed, and the channel quality is detected through the estimated BER.

Through the method for detecting the channel quality provided by this embodiment, the values of the I/Q components of the TPC symbol are judged to determine whether the TPC symbol is the invalid symbol, the polarities of the I/Q components of the valid symbol are further judged; the number of the invalid symbols, the number of the valid symbols, and the number of the valid symbols with the opposite polarities are counted according to the judgment results, and the BER is estimated according to the counted numbers, so as to detect the channel quality through the BER, thereby overcoming the defect that the BER cannot be correctly estimated in the case of an invalid TPC symbol in the prior art, and more correctly estimating the BER, so as to correctly perform in-sync decision and outer-loop power control.

Figure 4:
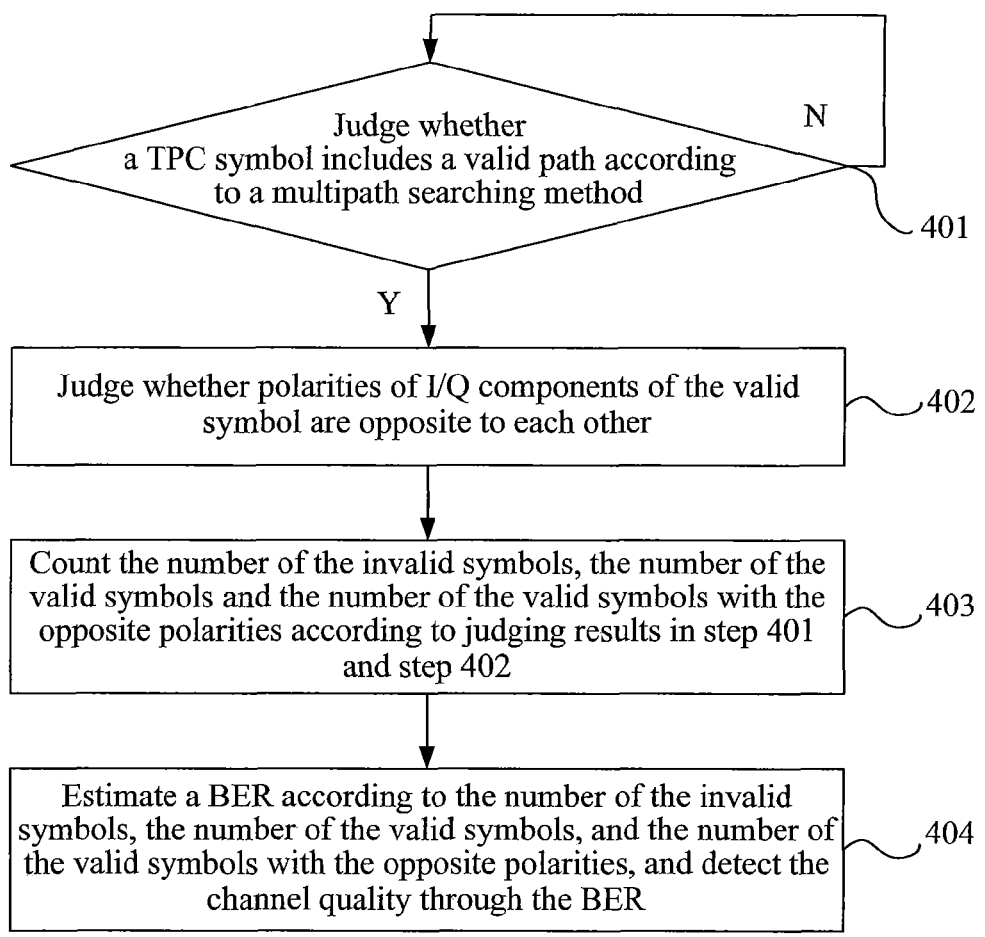
FIG. 4 is a flow chart of Embodiment 3 of a method for detecting channel quality according to the present invention.

FIG. 4 is a flow chart of Embodiment 3 of a method for detecting channel quality according to the present invention. As shown in FIG. 4, this embodiment provides another method for detecting the channel quality, which may include the following steps.

Step 401: Judge whether a TPC symbol output by a receiver includes a valid path according to a multipath searching method, and if the TPC symbol is a valid symbol, perform step 402; if the TPC symbol is an invalid symbol, continue to judge a next TPC symbol, and repeat step 401.

In this embodiment, the plurality of TPC symbols output by the RAKE receiver in the BER counting period T is still counted for estimation. In this step, when the validity of the TPC symbol output by the RAKE receiver is judged, specifically, it is judged whether the TPC symbol includes a valid path according to the multipath searching method, in which, the multipath searching method is an algorithm known by persons skilled in the art. Between the TPC symbols output by the receiver, each TPC symbol is searched through the multipath searching method to obtain a multipath indication result, and the multipath indication result is used to indicate the number of the valid paths included by each TPC symbol.

If the number of the valid paths included by the TPC symbol is zero, it indicates that the TPC symbol is an invalid symbol; and if the number of the valid paths included by the TPC symbol is not zero, it indicates that the TPC symbol is a valid symbol. If the TPC symbol is a valid symbol, the number of the valid symbols is increased, and the subsequent step 402 is further performed; and if the TPC symbol is the invalid symbol, the number of the invalid symbols is increased, and the validity of a next TPC symbol output by the RAKE receiver is further judged, that is, step 401 is repeated till the judgment of all the TPC symbols output by the RAKE receiver in the BER counting period T is completed.

Step 402: Judge whether polarities of I/Q components of the valid symbol are opposite to each other, in which this step is similar to step 202, and is not described in detail herein again.

Step 403: Count the number of the invalid symbols, the number of the valid symbols and the number of the valid symbols with the opposite polarities according to judgment results in step 401 and step 402. This step is similar to step 203, which is not described in detail herein again.

Step 404: Estimate a BER according to the number of the invalid symbols, the number of the valid symbols, and the number of the valid symbols with the opposite polarities, and detect the channel quality through the BER, in which this step is similar to step 204, and is not described in detail herein again.

Figure 5:
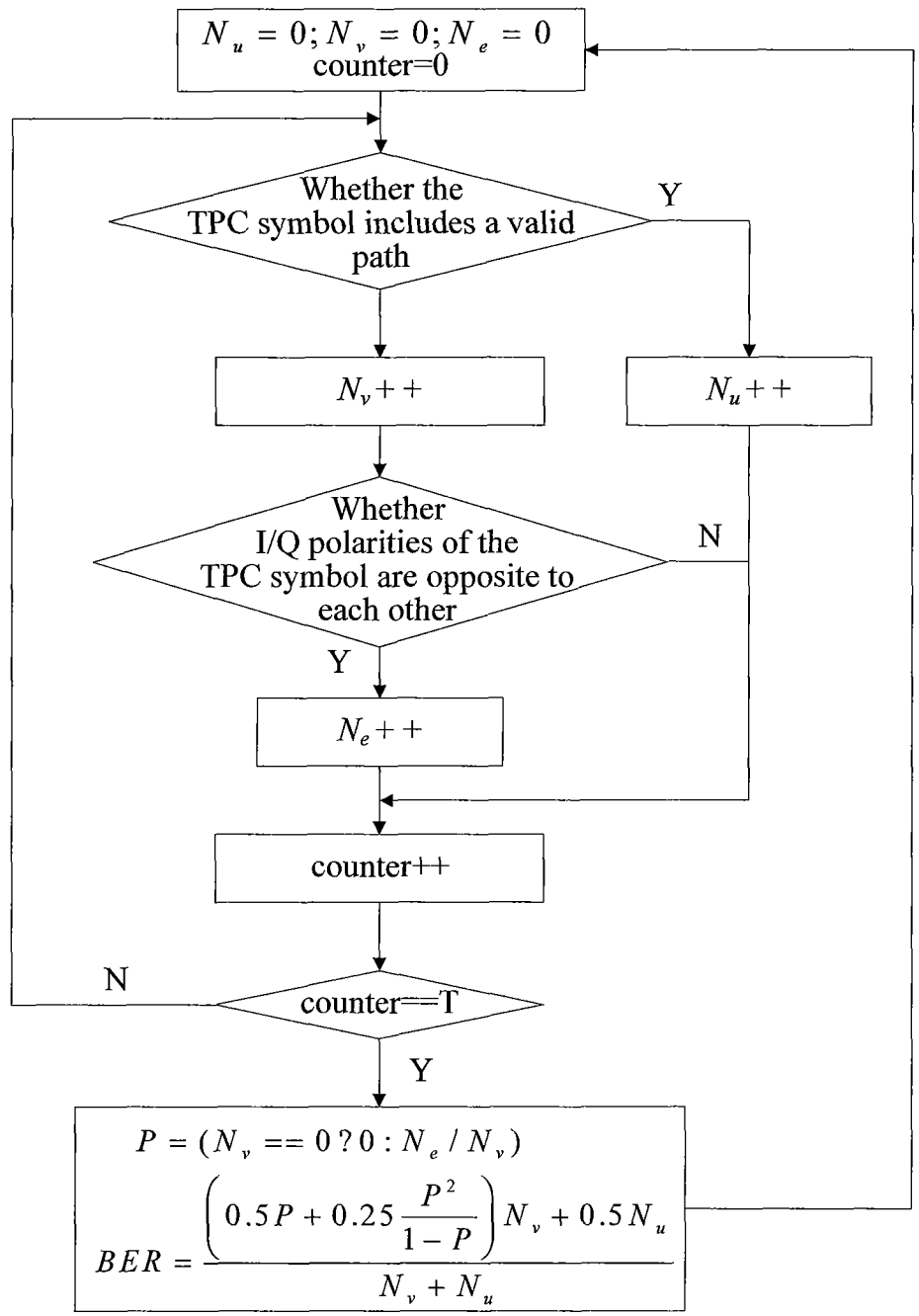
FIG. 5 is a specific flow chart of software implementation in Embodiment 3 of the method for detecting channel quality according to the present invention.

Specifically, FIG. 5 is a specific flow chart of software implementation in Embodiment 3 of the method for detecting channel quality according to the present invention. As shown in FIG. 5, the meanings of the symbols in FIG. 5 are similar to the meanings of the symbols in FIG. 3, which are not described in detail herein again. It can be seen from FIG. 5 that, when it is judged that the TPC symbol does not include any valid path, the command "$N_u$++" is executed, that is, the number of the invalid symbols is updated; if the TPC symbol includes a valid path, the command "$N_v$++" is executed, that is, the number of the valid symbols is updated. After the command "$N_v$++" is executed, it is further judged whether the polarities of the I/Q components of the valid symbol are opposite to each other, that is, whether the I/Q polarities of the valid symbol are opposite to each other, and if the polarities are opposite to each other, the command "$N_e$++" is executed, that is, the number of the valid symbols with the opposite polarities is updated, and the command "counter++" is further executed. After the command "counter++" is executed, it is judged whether the current variable "counter" is equal to the BER counting period T, and if counter=T, it indicates that the BER counting period is over. The estimation of the BER begins, the command "P=($N_v$==0?0:$N_e$/$N_v$)" is executed, the BER is estimated through the foregoing formula (2) according to the currently counted $N_u$, $N_v$ and $N_e$, the estimation of the BER in the current BER counting period is completed, and the channel quality is detected through the estimated BER.

Through the method for detecting the channel quality provided by this embodiment, the number of the valid paths of the TPC symbol is judged through the multipath searching method to determine whether the TPC symbol is the invalid symbol, the polarities of the I/Q components of the valid symbol are further judged, the number of the invalid symbols, the number of the valid symbols, and the number of the valid symbols with the opposite polarities are counted according to the judgment results, and the BER is estimated according to the counted numbers, so as to detect the channel quality through the BER, thereby overcoming the defect that the BER cannot be correctly estimated in the case where the channel condition is poor and the TPC symbol has no path in the prior art, and more correctly estimating the BER, so as to correctly perform in-sync decision and outer-loop power control.

Figure 6:
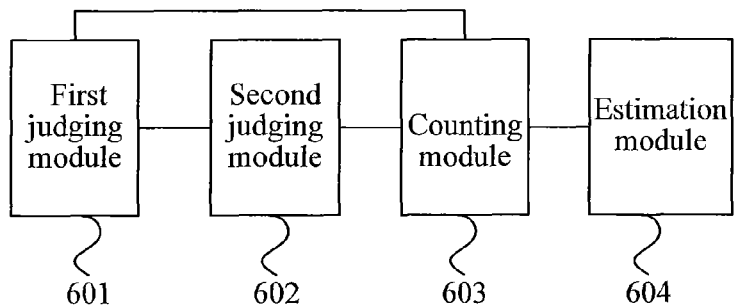
FIG. 6 is a structure diagram of Embodiment 1 of a device for detecting channel quality according to the present invention.

FIG. 6 is a structure diagram of Embodiment 1 of a device for detecting channel quality. As shown in FIG. 6, this embodiment provides a device for detecting channel quality, which may perform the steps in the foregoing method embodiment, and the steps are not described in detail herein again. The device for detecting the channel quality may include a first judging module 601, a second judging module 602, a counting module 603 and an estimation module 604. The first judging module 601 is configured to sequentially judge whether a TPC symbol output by a receiver is an invalid symbol. The second judging module 602 is configured to judge whether polarities of I/Q components of a valid symbol are opposite to each other when the first judging module 601 judges that the TPC symbol is a valid symbol. The counting module 603 is configured to count the number of the invalid symbols, the number of the valid symbols, and the number of the valid symbols with the opposite polarities according to judgment results of the first judging module 601 and the second judging module 602. The estimation module 604 is configured to estimate a BER according to the number of the invalid symbols, the number of the valid symbols and the number of the valid symbols with the opposite polarities obtained by the counting module 603, and detect the channel quality through the BER.

Through the device for detecting the channel quality provided by this embodiment, the first judging module, the second judging module, the counting module and the estimation module are set to judge whether the TPC symbol is an invalid symbol, further judge the polarities of the I/Q components of the valid symbol, count the number of the invalid symbols, the number of the valid symbols, and the number of the valid symbols with the opposite polarities according to the judgment results, and estimate the BER according to the counted numbers, so as to detect the channel quality through the BER, thereby overcoming the defect that the BER cannot be correctly estimated in the case of an invalid TPC symbol in the prior art, and more correctly estimating the BER, so as to correctly perform in-sync decision and outer-loop power control.

Figure 7:
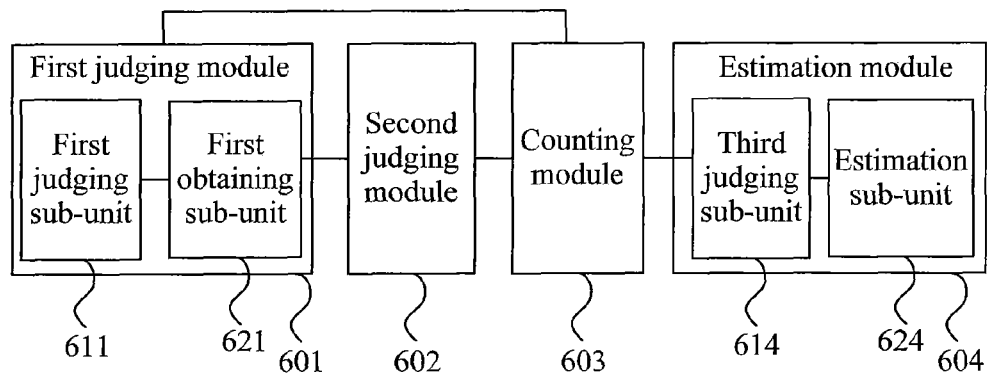
FIG. 7 is a structure diagram of Embodiment 2 of a device for detecting channel quality according to the present invention.

FIG. 7 is a structure diagram of Embodiment 2 of a device for detecting channel quality according to the present invention. As shown in FIG. 7, this embodiment is based on Embodiment 1 shown in FIG. 6, in which the first judging module 601 may include a first judging sub-unit 611 and a first obtaining sub-unit 621. The first judging sub-unit 611 is configured to judge whether an in-phase component of a TPC symbol output by a receiver is zero, and whether a quadrature component of the TPC symbol is zero. The first obtaining sub-unit 621 is configured to judge that the TPC symbol is an invalid symbol when the I/Q components of the TPC symbol both are zero, and judge that the TPC symbol is a valid symbol when the in-phase component or the quadrature component of the TPC symbol is not zero.

Further, the estimation module 604 may include a third judging sub-unit 614 and an estimation sub-unit 624, in which the third judging sub-unit 614 is configured to judge whether the number of the valid symbols is zero. The estimation sub-unit 624 is configured to enable P=0 when a judgment result of the third judging sub-unit 614 is that the number of the valid symbols is zero, determine that the BER is 0.5 according to the foregoing formula (2), and when the judgment result of the third judging sub-unit 614 is that the number of the valid symbols is not zero, use the following formula:

$$\frac{\left(0.5P + 0.25\frac{P^2}{1-P}\right)N_v + 0.5N_u}{N_v + N_u}$$

to estimate the BER according to the number of the invalid symbols, the number of the valid symbols and the number of the valid symbols with the opposite polarities, in which $$P = \frac{N_e}{N_v},$$

$N_v$ is the number of the valid symbols, $N_u$ is the number of the invalid symbols, and $N_e$ is the number of the valid symbols with the opposite polarities.

Through the device for detecting the channel quality provided by this embodiment, the values of the I/Q components of the TPC symbol are judged to determine whether the TPC symbol is an invalid symbol, the polarities of the I/Q components of the valid symbol are further judged, the number of the invalid symbols, the number of the valid symbols, and the number of the valid symbols with the opposite polarities are counted according to the judgment results, and the BER is estimated according to the counted numbers, so as to detect the channel quality through the BER, thereby overcoming the defect that the BER cannot be correctly estimated in the case of an invalid TPC symbol in the prior art, and more correctly estimating the BER, so as to correctly perform in-sync decision and outer-loop power control.

Figure 8:
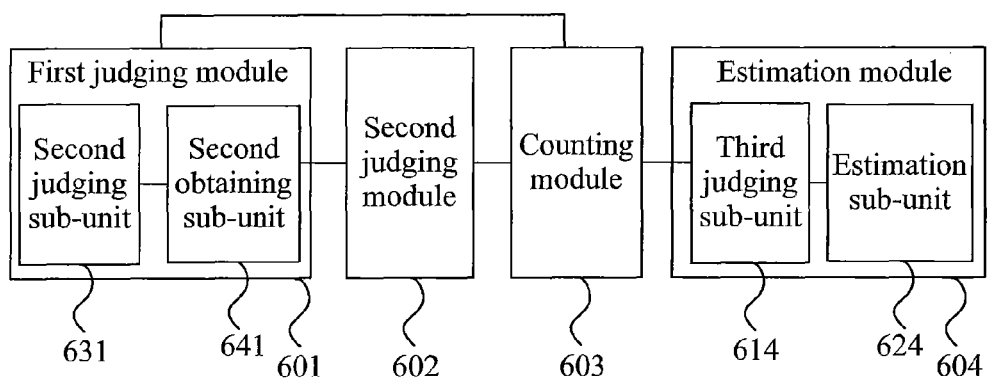
FIG. 8 is a structure diagram of Embodiment 3 of a device for detecting channel quality according to the present invention.

FIG. 8 is a structure diagram of Embodiment 3 of a device for detecting channel quality according to the present invention. As shown in FIG. 8, this embodiment is based on Embodiment 1 shown in FIG. 6, in which the first judging module 601 may include a second judging sub-unit 631 and a second obtaining sub-unit 641. The second judging sub-unit 631 is configured to sequentially judge whether the TPC symbol output by the receiver includes a valid path. The second obtaining sub-unit 641 is configured to judge that the TPC symbol is a valid symbol when the TPC symbol includes a valid path; and if the TPC symbol does not include any valid path, judge that the TPC symbol is an invalid symbol.

Further, the estimation module 604 may include a third judging sub-unit 614 and an estimation sub-unit 624, in which the third judging sub-unit 614 is configured to judge whether the number of the valid symbols is zero. The estimation sub-unit 624 is configured to enable P=0 when a judgment result of the third judging sub-unit 614 is that the number of the valid symbols is zero, determine that the BER is 0.5 according to the foregoing formula (2), and when the judgment result of the third judging sub-unit 614 is that the number of the valid symbols is not zero, use the following formula:

$$\frac{\left(0.5P + 0.25\frac{P^2}{1-P}\right)N_v + 0.5N_u}{N_v + N_u}$$

to estimate the BER according to the number of the invalid symbols, the number of the valid symbols and the number of the valid symbols with the opposite polarities, in which $$P = \frac{N_e}{N_v},$$

$N_v$ is the number of the valid symbols, $N_u$ is the number of the invalid symbols, and $N_e$ is the number of the valid symbols with the opposite polarities.

Through the device for detecting the channel quality provided by this embodiment, the number of the valid paths of the TPC symbol is judged through the multipath searching method to determine whether the TPC symbol is an invalid symbol, the polarities of the I/Q components of the valid symbol are further judged, the number of the invalid symbols, the number of the valid symbols, and the number of the valid symbols with the opposite polarities are counted according to the judgment results, and the BER is estimated according to the counted numbers, so as to detect the channel quality through the BER, thereby overcoming the defect that the BER cannot be correctly estimated in the case where the channel condition is poor and the TPC symbol has no path in the prior art, and more correctly estimating the BER, so as to correctly perform in-sync decision and outer-loop power control.

This embodiment further provides a system for detecting channel quality, which may include the device for detecting the channel quality as shown in FIG. 6, FIG. 7 and FIG. 8. It is judged whether the TPC symbol is the invalid symbol, the polarities of the I/Q components of the valid symbol are further judged, the number of the invalid symbols, the number of the valid symbols, and the number of the valid symbols with the opposite polarities are counted according to the judgment results, and the BER is estimated according to the counted numbers, so as to detect the channel quality through the BER. Through this embodiment, the defect that the BER cannot be correctly estimated in the case of an invalid TPC symbol in the prior art is overcome, and the BER is more correctly estimated, so as to correctly perform in-sync decision and outer-loop power control.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for detecting channel quality by a device, comprising:
   judging whether a Transmit Power Control TPC symbol output by a receiver is an invalid symbol; and
   executing by the device:
      when the TPC symbol is a valid symbol, judging whether polarities of in-phase and quadrature I/Q components of the valid symbol are opposite to each other;
      counting the number of invalid symbols, the number of valid symbols, and the number of valid symbols with opposite polarities; and
      estimating a Bit Error Rate BER according to the number of the invalid symbols, the number of the valid symbols, and the number of the valid symbols with the opposite polarities, and detecting the channel quality through the BER.

2. The method according to claim 1, wherein the judging whether the TPC symbol output by the receiver is an invalid symbol comprises:
   judging whether the in-phase component of the TPC symbol output by the receiver is zero, and whether the quadrature component of the TPC symbol is zero; and
   judging that the TPC symbol is an invalid symbol when the I/Q components of the TPC symbol both are zero, and judging that the TPC symbol is a valid symbol when the in-phase component or the quadrature component of the TPC symbol is not zero.

3. The method according to claim 1, wherein the judging whether the TPC symbol output by the receiver is an invalid symbol comprises:
   sequentially judging whether the TPC symbol output by the receiver comprises a valid path according to a multipath searching method; and
   judging that the TPC symbol is a valid symbol when the TPC symbol comprises a valid path, and judging that the TPC symbol is an invalid symbol if the TPC symbol does not comprise any valid path.

4. The method according to claim 2, wherein the estimating the BER according to the number of the invalid symbols, the number of the valid symbols, and the number of the valid symbols with the opposite polarities comprises:
   judging whether the number of the valid symbols is zero;
   when the number of the valid symbols is zero, determining that the BER is 0.5; and
   when the number of the valid symbols is not zero, using the following formula:

$$\frac{\left(0.5P + 0.25\frac{P^2}{1-P}\right)N_v + 0.5N_u}{N_v + N_u}$$

to estimate the BER according to the number of the invalid symbols, the number of the valid symbols and the number of the valid symbols with the opposite polarities, wherein $$P = \frac{N_e}{N_v},$$

$N_v$ is the number of the valid symbols, $N_u$ is the number of the invalid symbols, and $n_e$ is the number of the valid symbols with the opposite polarities.

5. A device for detecting channel quality, comprising:
   a first judging module, configured to judge whether a Transmit Power Control TPC symbol output by a receiver is an invalid symbol;
   a second judging module, configured to judge whether polarities of in-phase and quadrature I/Q components of a valid symbol are opposite to each other when the TPC symbol is a valid symbol;
   a counting module, configured to count the number of invalid symbols, the number of valid symbols, and the number of valid symbols with opposite polarities according to judgment results of the first judging module and the second judging module; and
   an estimation module, configured to estimate a Bit Error Rate BER according to the number of the invalid symbols, the number of the valid symbols, and the number of the valid symbols with the opposite polarities, and detect the channel quality through the BER.

6. The device according to claim 5, wherein the first judging module comprises:
   a first judging sub-unit, configured to judge whether the in-phase component of the TPC symbol output by the receiver is zero, and whether the quadrature component of the TPC symbol is zero; and
   a first obtaining sub-unit, configured to judge that the TPC symbol is an invalid symbol when the I/Q components of the TPC symbol both are zero, and judge that the TPC symbol is a valid symbol when the in-phase component or the quadrature component of the TPC symbol is not zero.

7. The device according to claim 5, wherein the first judging module comprises:
   a second judging sub-unit, configured to sequentially judge whether the TPC symbol output by the receiver comprises a valid path; and
   a second obtaining sub-unit, configured to judge that the TPC symbol is a valid symbol when the TPC symbol comprises a valid path; and judge that the TPC symbol is an invalid symbol if the TPC symbol does not comprise any valid path.

8. The device according to claim 6, wherein the estimation module comprises:
   a third judging sub-unit, configured to judge whether the number of the valid symbols is zero; and
   an estimation sub-unit, configured to determine that the BER is 0.5 when the number of the valid symbol is zero, and when the number of the valid symbol is not zero, use the following formula:

$$\frac{\left(0.5P + 0.25\frac{P^2}{1-P}\right)N_v + 0.5N_u}{N_v + N_u}$$

to estimate the BER according to the number of the invalid symbols, the number of the valid symbols and the number of the valid symbols with the opposite polarities, wherein $$P = \frac{N_e}{N_v},$$

$N_v$ is the number of the valid symbols, $N_u$ is the number of the invalid symbols, and $N_e$ is the number of the valid symbols with the opposite polarities.

* * * * *